United States Patent [19]

Wirt

[11] Patent Number: 4,779,985

[45] Date of Patent: Oct. 25, 1988

[54] DITHER SUSPENSION FOR RING LASER GYROSCOPE AND METHOD

[75] Inventor: Thomas M. Wirt, Yorba Linda, Calif.

[73] Assignee: Litton Systems, Inc., Beverly Hills, Calif.

[21] Appl. No.: 945,421

[22] Filed: Dec. 22, 1986

[51] Int. Cl.$^4$ ............................................... G01C 19/64
[52] U.S. Cl. ........................................ 356/350; 372/94
[58] Field of Search ........................... 356/350; 372/94

[56] References Cited

U.S. PATENT DOCUMENTS

| | | | |
|---|---|---|---|
| 3,395,270 | 7/1968 | Speller | 235/150.25 |
| 3,411,849 | 11/1968 | Aronowitz | 356/28 |
| 3,503,005 | 3/1970 | Mocker | 331/94.5 |
| 3,512,890 | 5/1970 | McLaughlin | 356/106 |
| 3,627,422 | 12/1971 | Chodorow | 356/106 |
| 3,697,887 | 10/1972 | Lee et al. | 331/94.5 |
| 3,743,969 | 7/1973 | Hutchings | 332/7.51 |
| 3,807,866 | 4/1974 | Zingery | |
| 3,854,819 | 12/1974 | Andringa | 356/106 |
| 4,013,365 | 3/1977 | Vali et al. | 356/106 |
| 4,039,260 | 8/1977 | Redman | 356/106 |
| 4,247,832 | 1/1981 | Sanders et al. | 331/94.5 |
| 4,248,534 | 2/1981 | Elbert | 356/350 |
| 4,267,478 | 5/1981 | Ljung et al. | 310/315 |
| 4,295,710 | 10/1981 | Heinz | 350/310 |
| 4,309,107 | 1/1982 | McNair et al. | 356/350 |
| 4,314,174 | 2/1982 | Wing et al. | 310/315 |
| 4,321,557 | 3/1982 | McNair | 372/33 |
| 4,349,183 | 9/1982 | Wirt et al. | 267/160 |
| 4,383,763 | 5/1983 | Hutchings et al. | 356/350 |
| 4,392,229 | 7/1983 | Hostetler | 372/94 |
| 4,422,762 | 12/1983 | Hutchings et al. | 356/350 |
| 4,436,423 | 3/1984 | Kumar et al. | 356/350 |
| 4,526,469 | 7/1985 | Egli et al. | 356/350 |
| 4,529,311 | 7/1985 | Morgan et al. | 356/350 |
| 4,530,097 | 7/1985 | Stokes et al. | 372/6 |
| 4,634,091 | 1/1987 | Butler | 248/637 |
| 4,653,918 | 3/1987 | Stjern et al. | 356/350 |

FOREIGN PATENT DOCUMENTS 2749157 11/1978 Fed. Rep. of Germany .
2271542 12/1973 France .

OTHER PUBLICATIONS

Coccoli, "An Overview of Laser Gyros", 12th Joint Services Data Exchange for Inertial Systems, Norfolk, VA 1978.
Menegozzi et al., "Theory of a Ring Laser", 1973, Physical Review, vol. 8, No. 4, pp. 2103–2125.
Kilpatrick, "The Laser Gyro", Oct. 1967, IEEE Spectrum, pp. 44–55.

Primary Examiner—Vincent P. McGraw
Attorney, Agent, or Firm—John H. Lynn

[57] ABSTRACT

A dither suspension for a ring laser gyroscope includes a central hub and a plurality of blades extending therefrom. One half of the blades are connected to a support ring, and the other half are connected to a support base that is fixed to the case. The support ring includes a boss extending from the ends thereof facing outward toward the ring laser gyroscope frame. The bosses contact the ring laser gyroscope frame so that a void is formed between the bosses and the frame, which prevents transmission of radially directed stresses from the dither flexure to the frame.

12 Claims, 6 Drawing Sheets

DITHER SUSPENSION FOR RING LASER GYROSCOPE AND METHOD

BACKGROUND OF THE INVENTION

This invention relates generally to rotation sensors and parficularly to ring laser gyroscope rotation sensors. Still more particularly, this invention relates to apparatus and methods for supporting a ring laser gyroscope frame to allow rotational motion about the input axis of the ring laser gyroscope to reduce the effects of lock-in and to provide extremely high stiffness for all other degrees of freedom to reduce coning errors.

A ring laser gyroscope employs the Sagnac effect to detect rotation. Two counterpropagating light beams in a closed loop will have transit times that differ in direct proportion to the rotation rate of the loop about an axis perpendicular to the piane of the loop. There are in general two basic techniques for utilizing the Sagnac effect to detect rotations. A first technique is the inter-ferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of iight and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured.

A ring laser gyroscope has a sensor axis that passes through the closed paths traversed by the counterpropagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

Ring laser gyroscopes may be classified as passive or active, depending upon whether the lasing, or gain, medium is external or internal to the cavity. In the active ring laser gyroscope the cavity defined by the closed optical path becomes an oscillator, and output beams from the two directions beat together to give a beat frequency that is a measure of the rotation rate. The oscillator approach means that the frequency filtering properties of the cavity resonator are narrowed by many orders of magnitude below the passive cavity and give very precise rotation sensing potential. To date the major ring laser gyroscope rotation sensor effort has been put into the active ring laser. Presently all commercially available optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold. The range of rotation rates over which lock-in occurs is the deadband of the ring laser gyroscope.

Lock-in is beiieved to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

Upon reversal of the sign of the frequency difference between the two beams, there is a tendency for the beams to lock-in since at some point the frequency difference is zero. Since the output of the ring laser gyroscope is derived from the frequency difference, an error accumulates in the output angle. Since the periods in which the two beams are locked in are usually very short in duration, the error is very small. However, since the error is cumulative, in time the error can become appreciable in precision navigation systems. This error is called random walk or random drift.

In addition to causing erroneous rotation rate information to be output from a ring laser gyroscope, lock-in causes standing waves to appear on the mirror surfaces. These standing waves may create a grating of high and low absorption regions, which create localized losses that increase the coupling between the beans and the lock-in. The mirrors may be permanently distorfed by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance the effective use of ring laser gyroscopes in such systems.

There are several known approaches to solving the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes.

Mechanical dithering is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon. Increasing the length of one side of each blade while shortening the other side causes the blades to flex or bend so that each blade experiences a small rotation about the ring laser gyroscope axis. The voltage is oscillatory so that the blades are constantly vibrating in phase, and the ring laser gyroscope frame mounted to the blades rotates about the axis.

Body dither must be accomplished so that dither oscillations cause the ring laser gyroscope frame to rotate only about the sensing axis. Any small component of rotation about other axes causes the sensing axis to precess in a cone-shaped path about the direction in should point. This motion of the axis is called coning. Any change in the direction of the axis due to dithering introduces errors into the output of the ring laser gyroscope. Since a navigation system includes three ring laser gyroscopes mounted in an instrument block with the sensing axes being mutually orthogonal, mechanical coupling of the dither oscillations is likely.

To reduce coning, the plane of oscillation of the flexure is aligned perpendicular to the sensing axis, and the axis of the dither is collinear with the sensing axis to very close tolerances. To further minimize oscillations about other axes, the dither flexure should be as rigid as possible to resist any tendency to oscillate about other axes. Since all mechanical systems have natural frequencies of oscillation, there will in general be some small amount of oscillation about other axes. Typical prior art dither flexures have rotational and translational resonant frequencies below 1000 Hz and have relatively high compliances, which, when combined with relatively low coning frequencies, lead to large system bias errors. These compliant flexures allow a relatively large amplitude frame input axis motion, which couples with system block motion to cause angle errors that cannot be software compensated.

U.S. Pat. No. 4,115,004 to Hutchings et al., assignee to Litton Systems, Inc., assignee of the present invention, discloses a dual spring system that mounts a counterweight to the ring laser gyroscope case to reduce oscillatory motion of the case due to oscillation of the gyroscope. This dual spring system includes a first set of springs mounted between the case and the gyroscope and a second set of springs mounted between the case and the counterweight.

U.S. Pat. No. 4,309,107 to McNair et al., assignee to Litton Systems, Inc., discloses a ring laser gyroscope dither mechanism for isolating vibrational energy generated by dithering the gyroscope and prevents that energy from passing to the mounting case of the gyroscope. McNair et al. discloses a three spring system mounting a gyroscope to a housing or case, mounting a counterweight to the gyroscope and mounting the counterweight to the case. This arrangement reduces the amount of angular vibrational energy that passes to the case of the gyroscope by using the counterweight to provide a reaction to the oscillations within the gyroscope caused by mechanically dithering to prevent lock-in.

U.S. Pat. No. 4,321,557 to McNair, assignee to Litton Systems, Inc., discloses a ring laser gyroscope coupling system in which a pair of resilient rings are located between a plate attached to the laser dither suspension mechanism and the lower surface of the case of the ring laser gyroscope to form a reservoir for a viscous fluid. The viscous fluid reduces transmission of thermal stresses between the case and the dither suspension mechanism.

U.S. Pat. No. 4,349,183 to Wirt et al., assignee to Litton Systems, Inc., discloses a spring flexure assembly for a ring laser gyroscope dithering mechanism. The assembly includes a plurality of flexure springs radially extending between a hub and a rim with each spring being driven by four piezoelectric wafers. Each spring has a reduced moment of inertia about an axis parallel to the common axis of the rim and hub and an increased circumferential bending in the region of attachment to the rim.

U.S. Pat. No. 3,464,657 to Bullard discloses a single set of springs connected between the frame and mounting platform of an aircraft instrument to isolate vibrational energy from the instrument.

U.S. Pat. No. 3,373,650 to Killpatrick discloses a dithering system in which a varying bias in the frequency is applied to at least one of the counterpropagating beams. The varying bias causes a varying frequency difference between the counterpropagating beams. This frequency difference is generally greater than the frequency difference that occurs at the lock-in threshold. The polarity of the frequency difference is periodically alternated so that the time integral of the frequency difference over the time interval between sign reversals is substantially zero.

U.S. Pat. No. 4,436,423 to Kumar et al. discloses a ring laser gyroscope suspension comprising a torsional hinge axially mounted within a central bore of a ring laser gyroscope body. The hinge comprises a plurality of angularly spaced wing sections having radially extending slits for permitting torsional motion of the gyroscope about the hinge. A plurality of spaced, curved segments bridge a gap between the wing sections and and the confronting surface of the bore and are cemented thereto for securement to the hinge.

Previous ring laser gyroscope dither flexures are mounted to the frames by relatively flexible bonding agents such as polyurethane glue to absorb thermal stresses to prevent thermal fluctuations from causing problems such as changing the path length or misaligning the counterpropagating beams in the resonant cavity. Misalignment reduces the power output of the ring laser gyroscope. Changes in the path length change the resonant wavelength of the resonant cavity and the wavelength at which the lasing medium will provide gain. Changing the wavelength changes the scale factor of the ring laser gyroscope, which is undesirable during operation thereof since the accuracy of measurements provided by the ring laser gyroscope requires a known, constant scale factor.

The excessive flexibility of prior methods for mounting dither flexures in ring laser gyroscope frames increases coning errors and lowers the resonant frequency of the dither flexure assembly. Typical prior art dither flexures have resonant frequencies of about 400–700 Hz. Since the ring laser gyroscope is dithered at about 300–500 Hz about the sensor axis, the dither vibrations about one axis are transmitted to the other axes. The resonant frequencies of these prior dither flexures are sufficiently close to the dither frequency that the dither drive also causes oscillations about axes of other ring laser gyroscopes that are typically included in a guidance system.

Prior dither flexures fit in a generally cylindrical cavity in the frame, and the outer surface of the dither flexure must be precisely machined and aligned concentrically with the cylindrical cavity. A uniform space must be provided between the dither flexure and the walls of the cylindrical cavity for receiving the flexible glue. Any misalignment of the components or nonuniformity in the gap will cause stress points in the frame, and such stress points may severely diminish the performance of the ring laser gyroscope.

SUMMARY OF THE INVENTION

The present invention provides a dither flexure structure that provides improved reduction in sensitivity to vibration and coning. The dither suspension according to the present invention has several advantages over other designs. The invention provides a reduction in the stress of the flexure material and piezoelectric drive material as functions of dither amplitude. The invention also provides an increase in the available driving torque from conventional piezoelectric drivers. The invention further provides an increase in stiffness to translational displacements.

The dither flexure of the invention is configured for mounting in a cavity in a ring laser gyroscope frame to dither the ring laser gyroscope. The dither flexure comprises a central hub portion and a plurality of vanes that each have an inner end extending from the hub. An outer end of the vanes projects away from the central portion, and a flexure ring is connected to the outer ends of the curved vanes.

A dither suspension for a ring laser gyroscope according to the invention includes a flexure that includes a central hub having a longitudinal axis, and a plurality of blades, each blade having a first end connected to the central hub and a second end extending radially from the central hub. The dither suspension may further include a support ring configured for mounting in the cavity, means for mounting a first portion of the blades to the support ring, and means for mounting a second portion of the blades to the case.

The support ring preferably has a generally cylindrical form and includes a boss extending radially outwardly from each end thereof so that when the support ring is placed inside the cavity, only the bosses contact the frame, leaving a void between the frame and the portion of the support ring between the bosses.

The support ring includes isolating means for preventing transmission of thermal or mechanical forces between the frame and dither suspension. The isolating means includes a first plurality of lengthwise slots through one of the bosses and a second plurality of lengthwise slots through the other boss, the first plurality of lengthwise slots and the second plurality of lengthwise slots being in alignment to form a plurality of opposing flexible portions in the support ring, the flexible portions being formed to prevent transmission of thermal or mechanical forces between the frame and dither suspension.

The dither suspension of the invention may also include a mass that extends from the outer end of each blade of the flexure toward an adjacent blade. The masses each preferably have a substantially uniform radial thickness except that adjacent the blades the radial thicknesses of the masses are decreased to facilitate angular motion of the masses relative to the blades.

The method of the invention for mounting a ring laser gyroscope frame to a case comprises forming a cavity in the frame; forming a flexure to include a central hub having a longitudinal axis, and a plurality of blades; connecting a first end of each blade to the central hub so that a second end of each blade extends radially from the central hub; mounting a support ring in the cavity; mounting a first portion of the blades to the support ring; and mounting a second portion of the blades to the case.

The method of the invention may further include the step of extending a mass from each blade of the flexure toward an adjacent blade. The method of the invention may further include the step of forming the masses to each have a substantially uniform radial thickness except that adjacent the blades the radial thicknesses of the masses are decreased to facilitate angular motion of the masses relative to the blades.

The method of the invention may further include the steps of forming the support ring to have a generally cylindrical shape, and extending a boss radially outwardly from each end of the support ring so that when the support ring is placed inside the cavity, only the bosses contact the frame, leaving a void between the frame and the portion of the support ring between the bosses.

The method of the invention may further include the step of forming the support ring to include isolating means for preventing transmission of thermal or mechanical forces between the frame and dither suspension. The method of the invention may further include the step of forming the isolating means to include a first plurality of lengthwise slots through one of the bosses and a second plurality of lengthwise slots through the other boss such that the first plurality of lengthwise slots and the second plurality of lengthwise slots are in alignment to form a plurality of opposing flexible portions in the support ring to prevent transmission of thermal or mechanical forces between the frame and dither suspension.

DESCRIPTION OF THE PREFERRED EMBODIMENT

Figure 1:
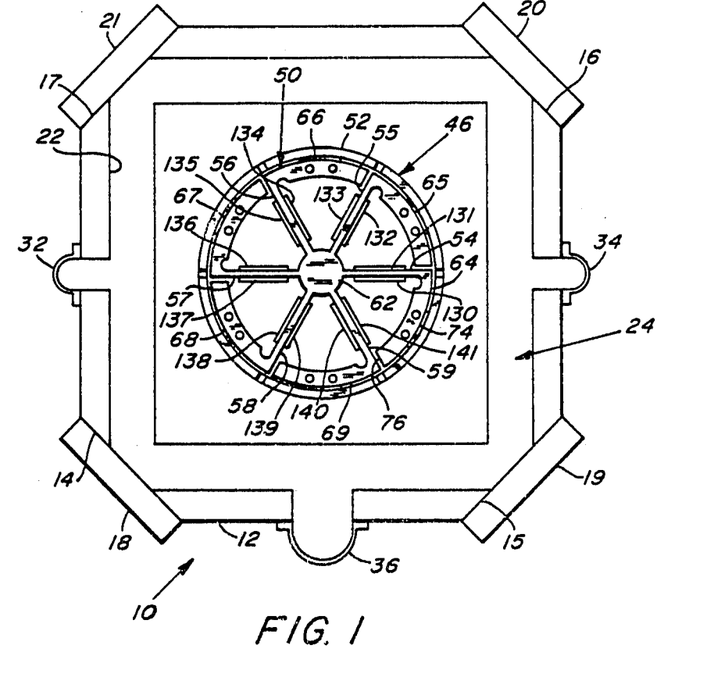
FIG. 1 is a plan view of a ring laser gyroscope frame including a dither suspension according to the present invention.

Referring to FIG. 1, a ring laser gyroscope 10 includes a frame 12 that has a generally rectangular shape with the corners cut off to form four mounting faces 14-17. A plurality of mirrors 18-21 are mounted on the mounting faces 14-17, respectively. A cavity 22 is formed in the frame 12 to form a path around the frame 12 between the mirrors 18-21.

A lasing medium 24 is placed in the cavity 22 to produce counterpropagating light beams 26 and 28 therein. The lasing medium 24 is typically a mixture of helium and neon. Energy is delivered to the lasing medium 24 by a power supply (not shown) which applies voltage to a pair of anodes 32 and 34 and to a cathode 36. Other structures may be used for the ring laser gyroscope 10. The basic description of the ring laser gyroscope 10 is presented by way of example and not for limitation of the present invention to a particular ring laser gyroscope structure.

One of the mirrors, for example the mirror 20 is partly transmissive so that a portion of each beam enters a prism 38 mounted to the back of the mirror 20. The prism 38 is formed to combine the counterpropagating beams so that they interfere with one another before impinging upon a photodetector 40.

The two counterpropagating beams undergo phase shifts in circulating around the cavity 22 by successive reflection from the mirrors 18-21 as the cavity 22 rotates about the longitudinal axis perpendicular to the plane of the cavity 22 and through the center thereof. This axis is sometimes called the sensing axis of the ring laser gyroscope 10. The difference in the phase of the two counterpropagating beams is indicative of the rotation rate of the cavity 22 about the sensing axis. Since the cavity 22 acts as a resonant cavity to the two beams, the frequency of each beam is sharply defined so that the phase shifts are detectable.

Figure 8:
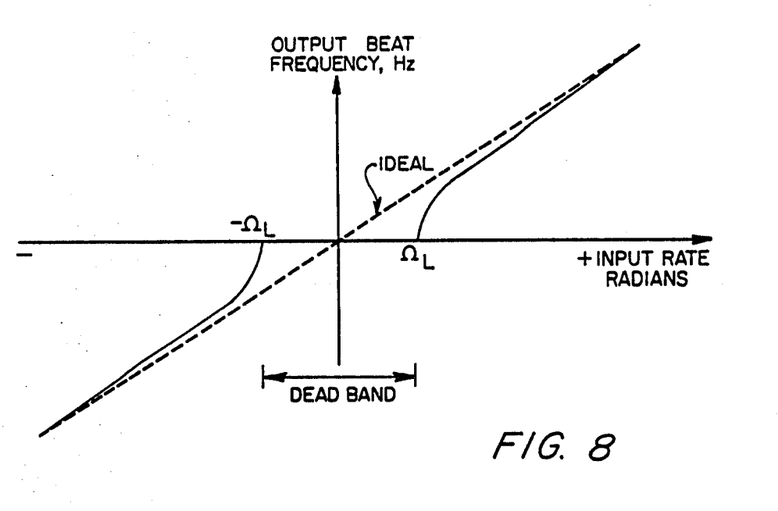
FIG. 8 graphically illustrates the output beat frequency of a ring laser gyroscope as a of rotation rate.

The two frequencies heterodyne and form a beat signal whose frequency is directly proportional to the rotation rate of the ring laser gyroscope 10 about its longitudinal. Referring to FIG. 8, when the rotation rate of a simple, unbiased ring laser gyroscope is reduced to the lock-in threshold rate $\Omega_L$, the counterpropagating beams lock at the same frequency. The frequencies of the counterpropagating beams are the same for a range of rotation rates $\pm\Omega_L$, which is the lock-in deadband shown in FIG. 8. Referring to FIG. 8, the signal output from the ring laser gyroscope 10 becomes non-linear in the vicinity of the deadband, which is a departure from the output of an ideal ring laser gyroscope.

Figure 9:
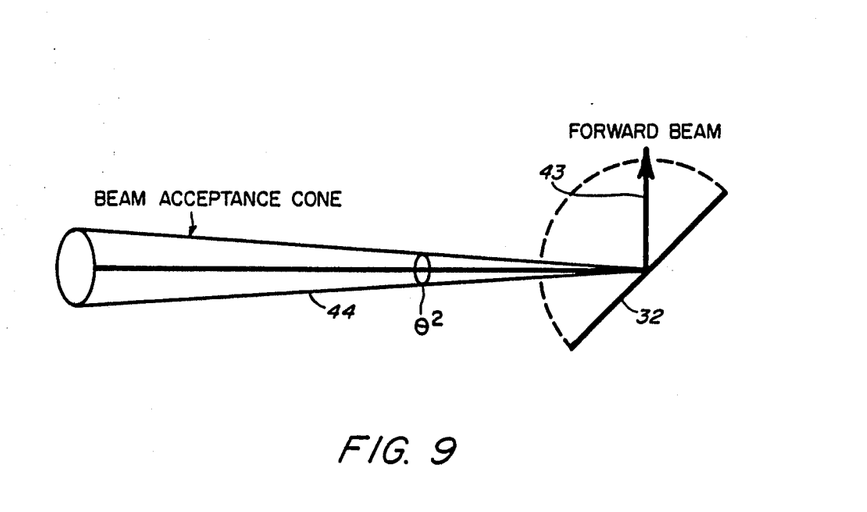
FIG. 9 illustrates forward reflected and backscattered light from a mirror of the type that may be included in the ring laser gyroscope of FIG. 1.

Referring to FIG. 9, lock-in is believed to be caused primarily by radiation backscattered from the mirrors 18-21. Since the counterpropagating beams strike each of the mirrors 18-21 at an angle of incidence of 45°, there would be no backscattered radiation from ideal, perfectly flat mirrors. A main portion 43 of each beam is forward reflected from the mirror 18, for example, according to the laws of reflection. However, even though the mirrors 18-21 are of very high quality, surface imperfections cause some specular reflection of each beam in all directions. A portion 44 of light from one beam that is backscattered into an acceptance solid angle for the oppositely directed beam couples thereto. The acceptance solid angle depends upon the wavelength of the light and the diameter of the cavity 22. For a typical square ring laser gyroscope 10 having a 45° angle of incidence, about one part in $10^6$ of the total specular reflection from any one of the mirrors 18-21 is scattered into the acceptance angle of the counterpropagating beam.

Figure 10A:
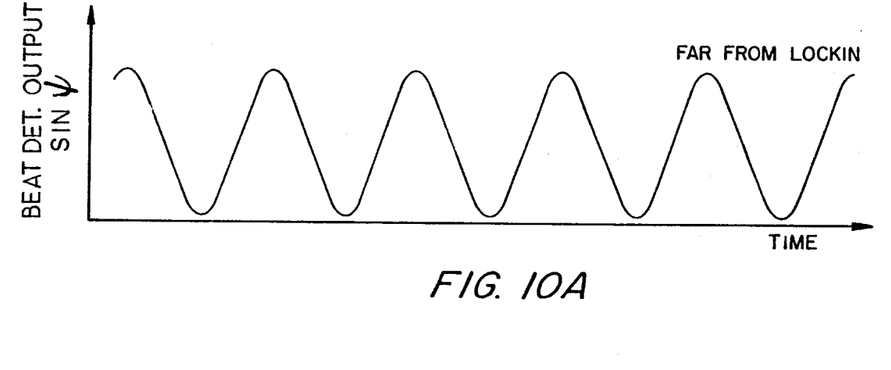
FIGS. 10A and 10B illustrate the output waveform of the ring laser gyroscope of FIG. 1 for rotation rates far from the lock-in threshold and near the lock-in threshold, respectively.
Figure 10B:
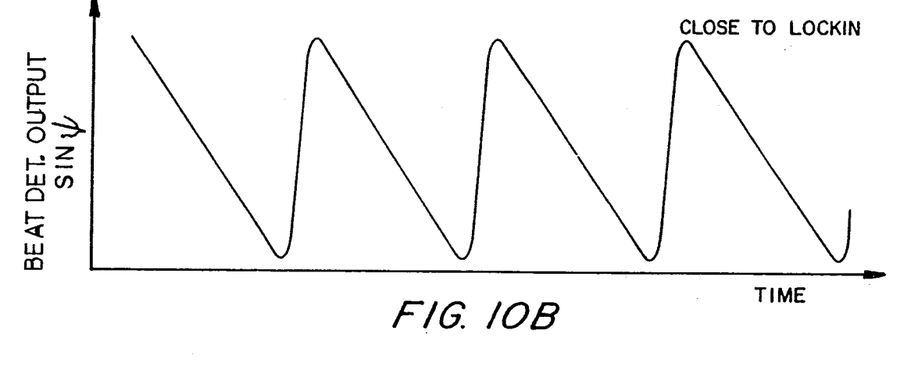

Referring to FIG. 10A, the output of the detector 40 as a function of time is sinusoidal when the rotation rate is far from the lockin threshold. Referring to FIG. 10B, when the rotation rate is near the lock-in threshold, the output of the detector 40 is distorted from the desired sinusoidal waveform. For a typical ring laser gyroscope having a cavity length of 49 cm, the lock-in threshold is about 100°/hr. Therefore, obtaining satisfactory results from the ring laser gyroscope 10 requires avoidance not only of lock-in but also avoidance of the rotation rates near the deadband.

Referring to FIGS. 1-6, the ring laser gyroscope 10 includes a dither suspension 46 mounted in a central passage 48 in the frame 12. The dither suspension 46 includes a flexure 50 and a support ring 52. There are stringent requirements that the dither suspension 46 must satisfy. The dither suspension 46 must transmit essentially no thermal stresses to the frame 12 to avoid misalignment of the cavity 22 and distortions of the optical path length for the counterpropagating beams.

Figure 6:
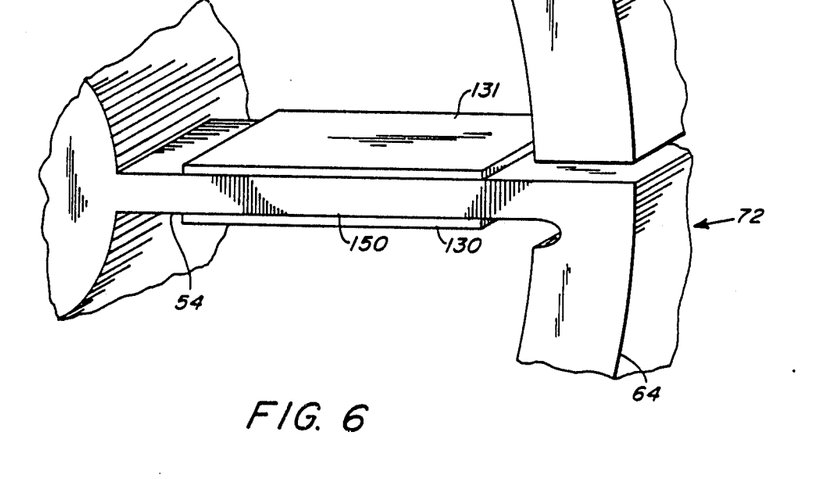
FIG. 6 is an isometric view of a portion of the dither suspension of FIGS. 1 and 2 showing a pair of piezoelectric elements mounted to the dither suspension.

To minimize errors due to lock-in, the frame 12 of the ring laser gyroscope 10 is oscillated relative to a support base 47 shown in FIG. 6. The dither suspension 46 must allow the frame 12 to oscillate only about the sensing axis of the ring laser gyroscope 10 to prevent coning.

Figure 2:
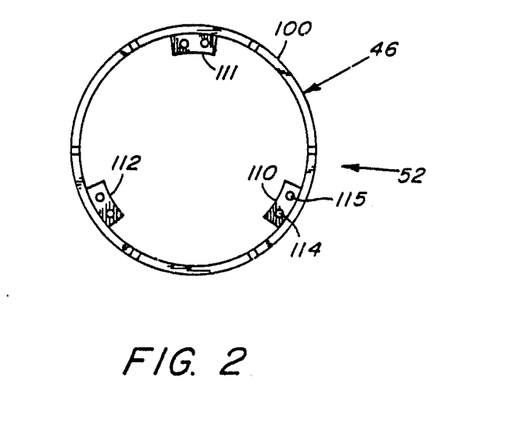
FIG. 2 is a plan view of a support ring used to mount the ring laser gyroscope frame of FIG. 1 upon the dither flexure of the present invention.
Figure 3:
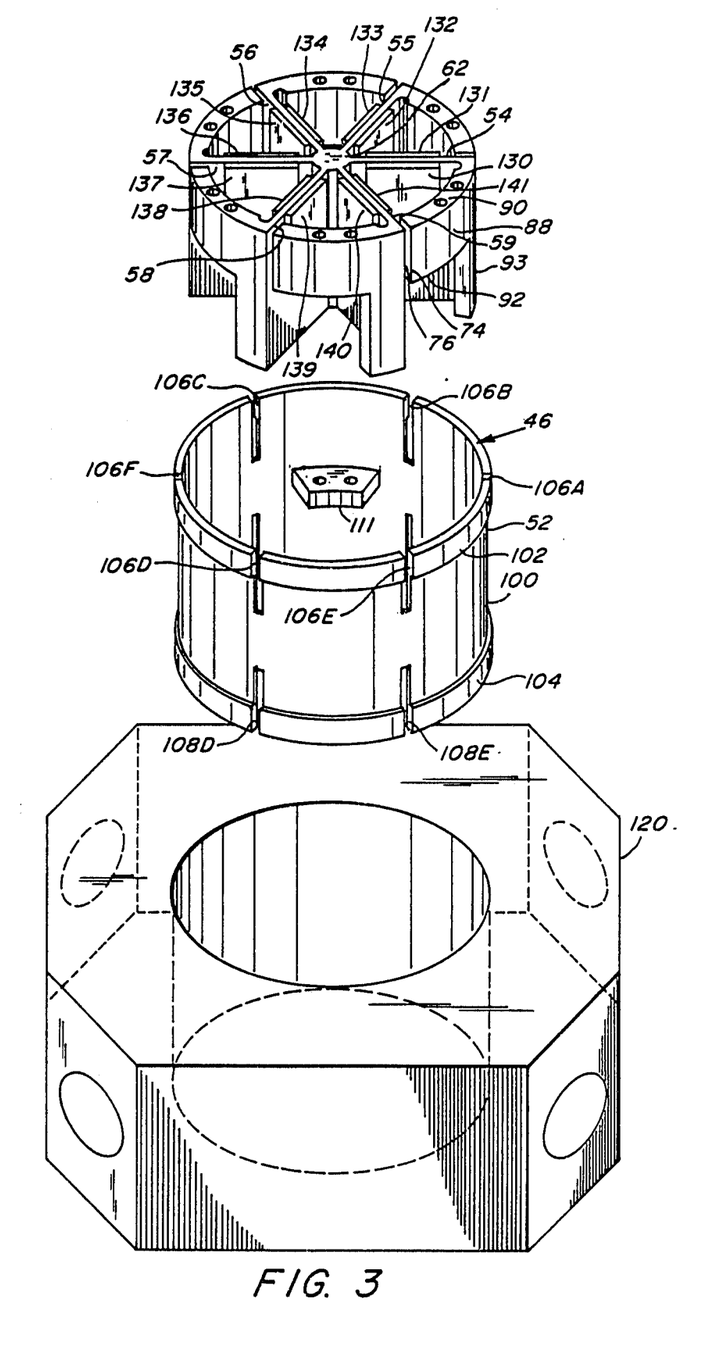
FIG. 3 is an exploded isometric view of the dither suspension and frame of FIG. 1 and the support ring of FIG. 2.

Referring to FIGS. 1 and 3, the flexure 50 includes a plurality of blades 54-59 that extend radially from a central region 62. Curved flexure portions 64-69 extend from the radially outward facing ends of the blades 54-59, respectively is mounted to a dither suspension 46. FIGS. 1 and 2 show the flexure 50 to have six blades and six corresponding curved flexure portions; however the invention is not limited to this particular structure, which is an exemplary preferred embodiment.

All of the blades 54-59 and the curved flexure portions 64-69. respectively, are substantially identical to each other. Therefore, only the blade 54 and the curved flexure portion 64 are described in detail. The blade 54 may be viewed as comprising a thin rectangular portion 66 having a length L, a width W, and a thickness T. The curved flexure portion 64 has an end 72 that extends from the outer end of the blade 54. The curved flexure portion 64 forms an arc of a circle, and an end 74 of the curved flexure portion 64 extends toward the blade 59. The end 74 of the curved flexure portion 64 does not contact the blade 59 so that there is a small gap 76 between the end 74 and the blade 59. The curved flexure portions 65-69 also extend from the blades 55-59 to leave gaps between ends 80-84 and the outer ends of the blades 55-59.

Referring to FIG. 1, the curved flexure portion 64 has an upper section 88 that includes an outer upper edge 90. The edge 90 has an arc length $\theta_1$ that is slightly less than 60° to leave the gap 76 between the end 74 and the blade 59. The upper section 88 has a lower edge 92 that has an arc length of $\theta_2$. A lower section 93 of the curved flexure portion 64 extends from the upper section 80 along the outer end of the blade 54 and has an arc length of $\theta_3$ such that $\theta_1 = \theta_2 + \theta_3$. Therefore, when viewed from the side, the curved flexure portion 64 appears to be in the form of an inverted L that has been reflected about a vertical line. Both the upper and lower sections of the curved flexure portion have a thickness t, which is preferably greater than the thickness T of the blade 54.

Figure 7:
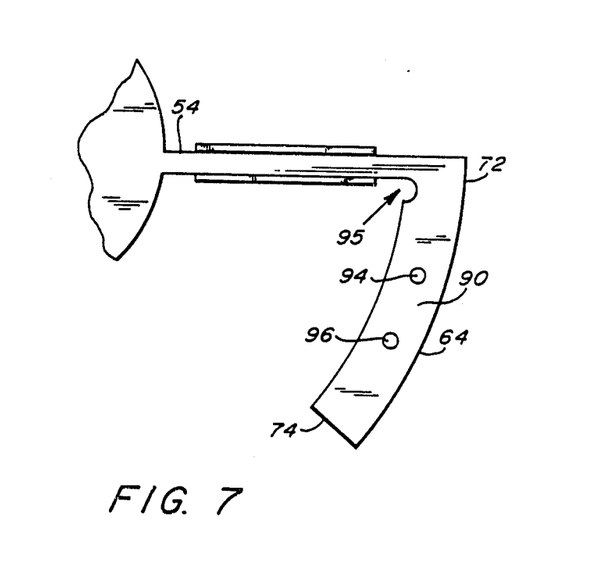
FIG. 7 is a plan view showing piezoelectric elements mounted to the dither suspension of FIGS. 1 and 2.

Referring to FIG. 7, the thickness of the curved flexure portion 64 at its juncture 95 with the blade 54 is reduced to a value $t_H$ that is less than the thickness t.

The curved flexure portion 64 has a relatively large moment of inertia about the central portion 62. The reduced thickness of the curved flexure portion 64 at the juncture of the curved flexure portion 64 allows bending at this juncture as the curved flexure portion 64 oscillates about the longitudinal axis of the flexure 50. The blade 54 remains essentially straight while the curved flexure portion 64 oscillates angularly about the central portion 62.

The curved flexure portion 64 includes a pair of bolt holes 94 and 96 therethrough. The bolt holes 94 and 96 are parallel to the longitudinal axis of the flexure 50. The other curved flexure portions 65-69 also have bolt holes similar to the bolt holes 94 and 96 therein.

Referring to FIGS. 2 and 3, the support ring 52 comprises a hollow, generally cylindrical body 100 having a pair of bosses 102 and 104 extending radially outward from the body 100. When the support ring 52 is mounted inside the frame 12, only the outward facing edges of the bosses 102 and 104 contact the frame 12 inside the cavity 48. The body 100 has a plurality of longitudinal slots 106A, 106B, etc. formed therein around the upper periphery thereof. A similar plurality of slots 108A, 108B, etc. are formed in the lower periphery of the body 100 with the slots 106A and 108A, 106B and 108B, etc. being aligned. The support ring 52 may be formed of invar, which has different thermal expansion constants than the glass ceramic frame material. Dimensional changes in the frame 12 and the support ring 52 cause the portions of the support ring 52 to bend so that these dimensional changes do not distort the frame 12 and the cavity 22.

A plurality of lugs 110-112 extend radially inward from the center of the support ring 52. The lugs 110-112 are arranged to align with the mounting holes in the curved flexure portions 64, 66 and 68 so that bolts (not shown) inserted through the bolt holes therein are aligned with threaded holes 114 and 115 in each of the lugs 110-112.

Figure 4:
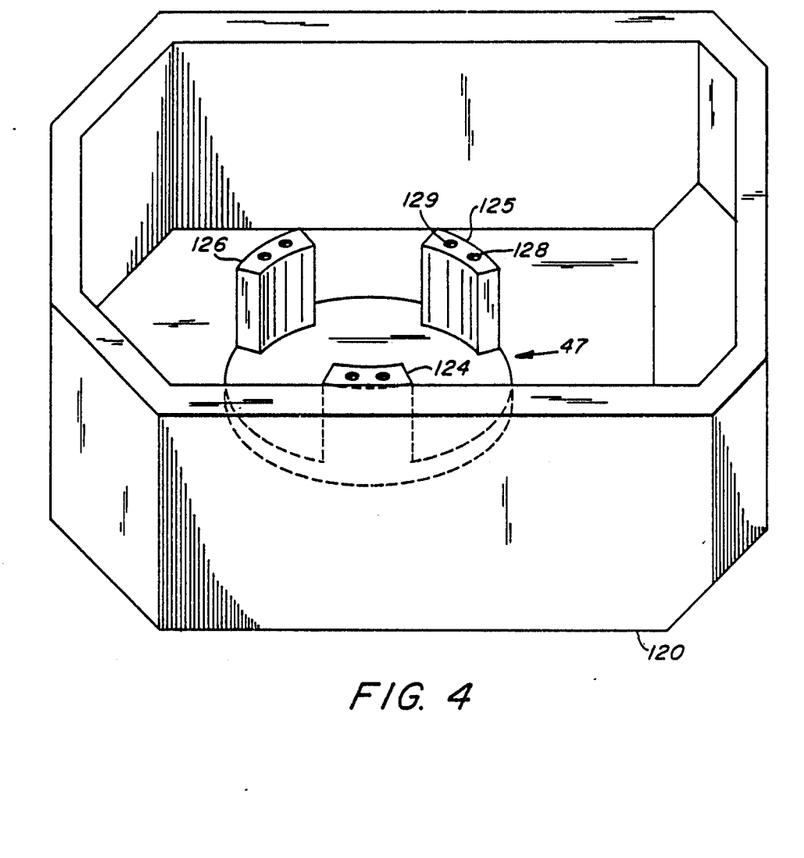
FIG. 4 is an isometric view of a support base and a case for mounting the support ring of FIG. 2.

Referring to FIG. 4, the frame 12 is mounted in a case 120, which may have any configuration suitable for containing the ring laser gyroscope 10. The support ring 52 is mounted to the support base 47 that is fixed inside the case 120. The support base 120 may have any suitable configuration and is shown to be cylindrical for convenience of illustration. A plurality of lugs 124-126 extend outwardly from the support base 122. The lugs 124-126 are arranged to align with the mounting holes in the curved flexure portions 65, 67 and 69 so that bolts (not shown) inserted through the bolt holes therein are aligned with threaded holes 128 and 129 in each of the lugs 124-126.

Referring to FIGS. 2 and 3, the ring laser gyroscope 10 including the dither suspension 46 has only a controlled small area of contact between the support ring 52 and the frame 12. The slots in the support ring 52 permit the support ring 52 to absorb stresses to prevent thermal and mechanical stresses from being transmitted from the dither suspension 46 to the frame 12.

Figure 5:
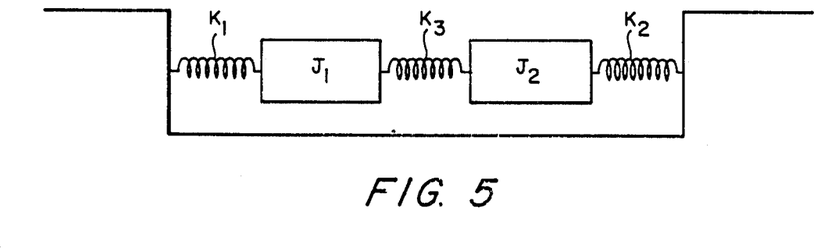
FIG. 5 schematically illustrates a mechanical model of the dither suspension of FIGS. 1 and 2.

Referring to FIG. 5, the three blades 64, 66 and 68 mounted to the support ring 52 comprise a spring 160 having a spring constant $k_1$. Similariy, the three blades 65, 67 and 69 mounted to the support base 47 comprise a spring 162 having a spring constant $k_2$. The narrowed portion at the juncture of the curved flexure portions with the blades may be viewed as having a separate spring constant $k_3$. An effective mass $J_1$ is mounted between the springs $K_1$, and $K_3$, and an effective mass $J_2$ is mounted between the springs $K_2$ and $K_3$.

Referring to FIGS. 3, 6 and 7, the dither suspension 46 includes means for oscillating the frame 12 about longitudinal axis of the flexure 50. In the preferred embodiment illustrated a plurality of piezoelectric drive elements 130-141 are mounted to the blades 64-69. The piezoelectric drive elements are mounted to the blades 64-69 in pairs so that each blade has two piezoelectric drive elements mounted thereon as shown in FIGS. 6 and 7. Since the piezoelectric drive elements 130-141 are all mounted in essentially the same manner, only the piezoelectric drive elements 130 and 131 that are mounted to the blades 64 are described in detail herein.

As can be seen from FIGS. 1, 3, 6 and 7, the piezoelectric drive elements 130-141 are thinner than the blades 64-69 and have generally rectangular shapes. The piezoelectric drive element 130, for example, is mounted on a straight, flat portion 150 of the blade 64. The piezoelectric drive element 130 is entirely on one side of an inflection point 152 of the blade 64. Since adjacent blades are relatively far apart between the straight portions, there is adequate space for installing the piezoelectric drive elements 130-141. The piezoelectric drive element 131 is mounted on the blade 64 opposite the piezoelectric drive element 130. The piezoelectric drive element 130 is poled oppositely to the piezoelectric drive element 131 such that application of a drive voltage thereto causes one side of the blade to radially contract while the other side radially expands. This expansion of one side and contraction of the other causes the blade 64 to bend so that application of an alternating voltage to the piezoelectric drive elements 130-141 causes all the blades 64-69 to oscillate in phase.

Referring to FIG. 1, if all of the piezoelectric drive elements 120-127 cause contraction while all of the piezoelectric drive elements 128-135 cause expansion, the result will be a counterclockwise rotation of the outer ring 52 about the longitudinal axis. Reversal of the drive voltage causes a clockwise rotation of the outer ring 52 about the longitudinal axis. The rotations of the outer ring 52 are typically about ±1.75 milliradians when the piezoelectric drive elements are driven by a power source (not shown) at a frequency of about 200 Hz by a voltage of ±20 volts rms.

A particular embodiment of the dither suspension 46 for use with a square ring laser gyroscope has the following nominal design values:

| Flexure | |
|---|---|
| blade thickness | 0.095 in. |
| blade length | 0.53 in. |
| blade height | 1.2 in. |
| Dither frequency | 370 Hz |
| PZT size | 1.2 in. × 0.25 in. |
| radial nat. freq. | 3300 Hz |
| axis nat freq. | 2430 Hz |
| Support Ring | |
| radial thickness | 0.04 in. |
| radial nat. freq. | 2670 Hz |
| Support Base | |
| nom. size | 0.425 in. × 0.23 in. |
| length | 0.725 in. |
| radial nat. freq. | 1090 Hz |

Although the invention has been described with reference to a specific preferred embodiment, the scope of the invention is not limited to the embodiment shown and described herein. Those skilled in the art may discover modifications of the preferred embodiment that are within the scope of the invention as defined by the appended claims.

What is claimed is:

1. A dither suspension for a ring laser gyroscope that includes a case and a frame having a cavity therein, comprising:
a flexure that includes a central hub having a longitudinal axis, and a plurality of blades, each blade having a first end connected to the central hub and a second end extending radially from the central hub;
a support ring configured for mounting in the cavity;
means for mounting a first portion of the blades to the support ring; and
means for mounting a second portion of the blades to the case.

2. The dither suspension of claim 1 wherein each blade of the flexure further includes a mass that extends from the second end thereof toward an adjacent blade.

3. The dither suspension of claim 2 wherein the masses each have a substantially uniform radial thickness except that adjacent the blades the radial thicknesses of the masses are decreased to facilitate angular motion of the masses relative to the blades.

4. The dither suspension of claim 1 wherein the support ring has a generally cylindrical form and includes a boss extending radially outwardly from each end thereof so that when the support ring is placed inside the cavity, only the bosses contact the frame, leaving a void between the frame and the portion of the support ring between the bosses.

5. The dither suspension of claim 4 wherein the support ring includes isolating means for preventing transmission of thermal or mechanical forces between the frame and dither suspension.

6. The dither suspension of claim 5 wherein the isolating means includes a first plurality of lengthwise slots through one of the bosses and a second plurality of lengthwise slots through the other boss, the first plurality of lengthwise slots and the second plurality of lengthwise slots being in alignment to form a plurality of opposing flexible portions in the support ring, the flexible portions being formed to prevent transmission of thermal or mechanical forces between the frame and dither suspension.

7. A method of mounting a ring laser gyroscope frame to a case, comprising the steps of:
forming a cavity in the frame;
forming a flexure to include a central hub having a longitudinal axis, and a plurality of blades;
connecting a first end of each blade to the central hub so that a second end of each blade extends radially from the central hub;
mounting a support ring in the cavity;
mounting a first portion of the blades to the support ring; and
mounting a second portion of the blades to the case.

8. The method of claim 7, further including the step of extending a mass from each blade of the flexure toward an adjacent blade.

9. The method of claim 8, further including the step of thickness except that adjacent the blades the radial thicknesses of the masses are decreased to facilitate angular motion of the masses relative to the blades.

10. The method of claim 9, further including the step of forming the support ring to have a generally cylindrical shape; and
extending a boss radially outwardly from each end of the support ring so that when the support ring is placed inside the cavity, only the bosses contact the frame, leaving a void between the frame and the portion of the support ring between the bosses.

11. The method of claim 10, further including the step of forming the support ring to include isolating means for preventing transmission of thermal or mechanical forces between the frame and dither suspension.

12. The method of claim 11 wherein the step of forming the isolating means includes forming a first plurality of lengthwise slots through one of the bosses and forming a second plurality of lengthwise slots through the other boss such that the first plurality of lengthwise slots and the second plurality of lengthwise slots are in alignment to form a plurality of opposing flexible portions in the support ring to prevent transmission of thermal or mechanical forces between the frame and dither suspension.

* * * * *